Sept. 23, 1969    J. J. LAMBE ET AL    3,469,184

METHOD OF ANALYZING A SUBSTANCE UTILIZING A TUNNELING JUNCTION

Filed Dec. 13, 1966

ROBERT C. JAKLEVIC
JOHN J. LAMBE
INVENTORS

BY *John R. Faulkner*
*William E. Johnson*

ATTORNEYS

United States Patent Office 3,469,184
Patented Sept. 23, 1969

3,469,184
METHOD OF ANALYZING A SUBSTANCE UTILIZING A TUNNELING JUNCTION
John J. Lambe and Robert C. Jaklevic, Birmingham, Mich., assignors to Ford Motor Company, Dearborn, Mich., a corporation of Delaware
Filed Dec. 13, 1966, Ser. No. 601,439
Int. Cl. G01r 27/02; G01n 27/00; H03k 17/00
U.S. Cl. 324—65                                          11 Claims

ABSTRACT OF THE DISCLOSURE

A method of analyzing a substance so as to ascertain the constituents thereof is disclosed in this specification. More specifically, the disclosed method utilizes a tunneling junction wherein the substance to be analyzed is deposited at the interface of the junction's insulating layer and one of its electrodes. The junction is subjected to a cryogenic temperature and a variable voltage is impressed thereon. The amount of current passing through the junction is measured and a plot is constructed wherein the second derivative of the current with respect to voltage is graphed against specific voltages. The peaks which occur on this plot identify specific constituents of the substance being analyzed. Disclosed tunneling junctions which may be employed with the method of this invention include: aluminum-aluminum oxide-lead, tantalum-tantalum oxide-lead, aluminum-aluminum oxide-tin and aluminum-aluminum oxide-aluminum.

BRIEF SUMMARY OF THE INVENTION

Figure 3:
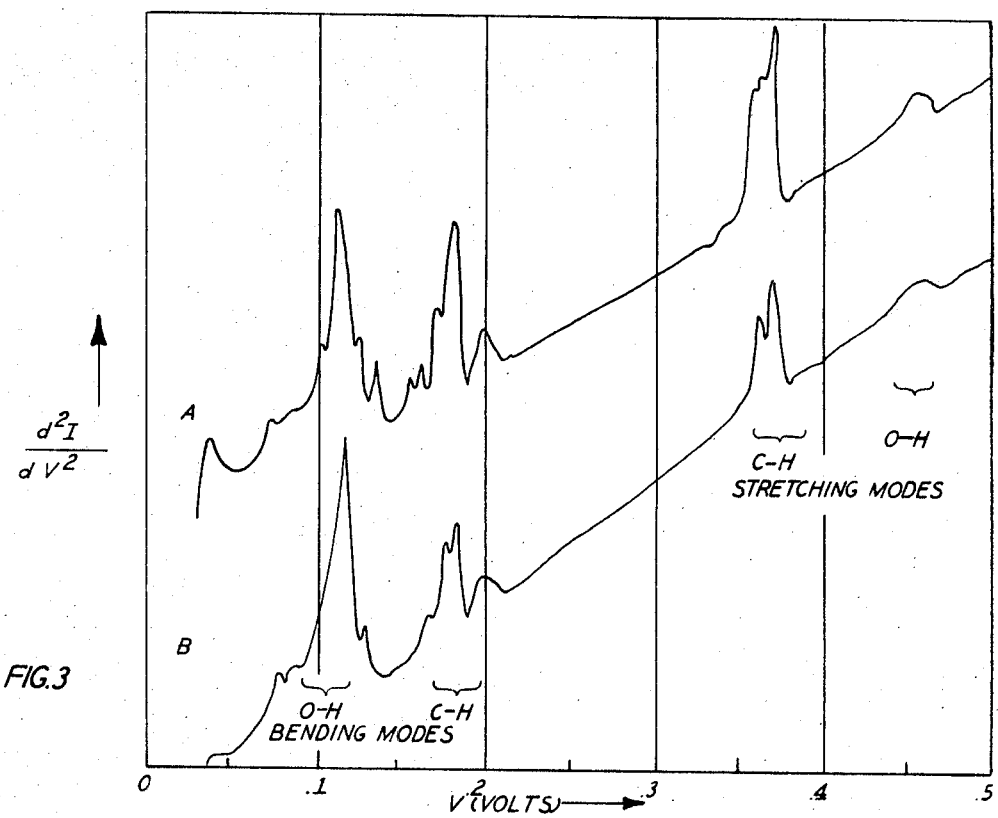

The method of this invention utilizes a new phenomenon which has been identified in tunneling junctions to analyze a substance so as to ascertain the constituents thereof. More specifically, tunneling electrons have been found to interact with vibrational states of impurity molecules which have been introduced at an electrode, insulating layer interface of a tunneling junction. The interaction of the tunneling electrons and the vibrational states of impurity molecules is detected by the method of this invention and utilized to identify the constituents of the impurity molecules.

As employed in this specification, the word "tunneling" is defined as a quantum mechanical phenomenon exhibited by particles that succeed in passing from one side of a potential barrier to the other side of the barrier even though these particles do not possess the energy of the level defined by the potential barrier.

In order to analyze a subtance so as to ascertain the constituents thereof, the method of this invention is carried out generally by the following steps. The substance to be analyzed is placed at the interface of an electrode and an insulating layer of a tunneling junction having a pair of electrodes with an insulating layer therebetween. More specifically, the subtance to be analyzed is generally deposited to a thickness of one mono-layer on a selected interface of the tunneling junction which is preferably of the type having metal electrodes and a metal oxide insulating layer. The tunneling junction is subjected to a cryogenic temperature approximating that of absolute zero and a variable voltage is impressed thereon. As the voltage is varied the tunneling electrons and the vibrational states of the molecules of the substance being analyzed interact and the amount of current which may pass through the junction increases with each interaction. Thus, the amount of current passing through the junction is measured as the voltage across the junction is varied in order to detect various interactions of the tunneling electrons and the vibrational states of the molecules of the substance. A plot is constructed wherein the second derivative of the measured junction current with respect to the impressed junction voltage is graphed against the particular voltage across the junction at the time the derivative is calculated. Peaks will occur in this plot at various specific voltages and will therefore identify the particular constituents of the substance being analyzed. The voltages at which specific peaks will occur and the shape of the peaks depend upon the type and quantity of a particular constituent of the substance being analyzed.

DESCRIPTION OF THE DRAWING VIEWS

Figure 1:
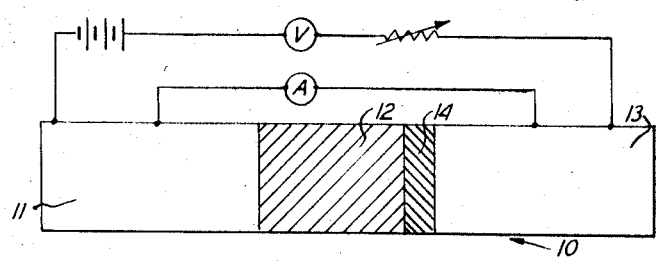
Figure 2:
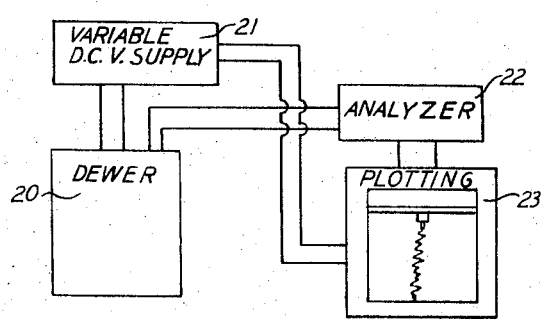

FIGURE 1 is a schematic drawing of a tunneling junction. FIGURE 2 is a schematic drawing of apparatus which may be utilized in the method of this invention. FIGURE 3 is a view showing typical analysis graphs obtained by the method of this invention.

DETAILED DESCRIPTION

In the study of a number of electrode-insulating layer-electrode tunneling junctions, a new phenomenon was observed and has been utilized to analyze substances so as to ascertain the constituents thereof. It was found that tunneling electrons interact with vibrational states of molecules of substances to be analyzed when the substances are placed at an electrode, insulating layer interface of a tunneling junction. More particularly, there has been found that increases in conductance G of the tunneling junction (first derivative of current passing through the junction with respect to voltage impressed on the junction at a particular impressed junction voltage) will occur at various characteristic impressed junction voltages in dependence upon the chemical constituents of the substance being analyzed.

The characteristic impressed junction voltages at which increases in conductance G are observed correspond to vibrational frequency $v$ of the particular molecules making up the substance contained at the interface of the electrode and insulating layer of the tunneling junction. The voltages V correspond to the vibrational frequency $v$ in accordance with the equation $eV = hv$ wherein $e/h$ is the ratio of the charge on an electron to Plank's constant. The increase in the conductance G at particular voltage V is generally in the range of about 1% and corresponds to the onset of a new tunneling channel at the particular voltage V which parallels the bulk of the tunneling current. The different characteristic voltages at which the conductance G changes for a single substance being analyzed depends directly upon the chemical constituents of the substance placed at the electrode, insulating layer interface of the tunneling junction.

In order to illustrate the method of this invention, a preferred embodiment thereof will be described in conjunction with the associated drawings. In the preferred embodiment, a tunneling junction, generally identified by the numeral 10 in FIGURE 1, is made up of an aluminum electrode 11, an aluminum oxide insulating layer 12 and a lead electrode 13. The insulating layer of aluminum oxide 12 is the tunneling medium for the tunneling junction 10 and has a thickness of 15–50 A. The substance to be analyzed 14 is placed between the insulating layer 12 and the electrode 13 and is preferably 1 mono-layer in thickness. The substance 14 can be placed at the interface between either electrode and the insulating layer.

The tunneling junction 10 can be constructed, for example, in the following manner. An oil-free, ultra-high vacuum system ($10^{-9}$ torr ultimate pressure), so equipped that air is not admitted to the system until all steps in the fabrication are completed, is pumped down and degassed. A ½ hour cleanup and a high purity $O_2$ discharge ($5 \times 10^{-2}$ torr, 500 volts) is then employed in the vacuum system before a second pump down thereof. Thereafter, a 2000 A. aluminum film 11 is evaporated onto a substrate, not shown. The aluminum film 11 is then partially oxidized to produce the insulating layer 12 of aluminum oxide thereon. More particularly, the oxidation of the aluminum film may be carried out in a manner more particularly described in an article by J. Miles and P. Smith, appearing in Journal Electrochemical Society, volume 110, page 1240, 1963.

After constructing the aluminum and aluminum oxide layers of the tunneling junction 10, the oxide layer is exposed to the substance to be analyzed. For example, in one case the oxide layer 12 was exposed to propionic acid vapor within the vacuum system and a mono-layer 14 of the acid vapor adhered to the oxide layer 12. After the substance to be analyzed is placed on the oxide layer 12, the tunneling junction 10 remains in the high vacuum system and the lead electrode 13 is placed over the impurity layer 14 by a metal evaporation operation. While in this illustration, the oxide layer 12 was exposed to the substance to be analyzed while the layer 12 remained in the vacuum system, it should be understood that the oxide layer may take on the substance to be analyzed outside the vacuum system by absorption, adsorption, dipping, spraying and other such general techniques.

The completed tunneling junction 10 is transferred to a dewar 20 of a low temperature liquid helium dewar system of standard design. Many such low temperature dewar systems are fully described and illustrated in Experimental Techniques in Low-Temperature Physics, by Guy Kendall White, Oxford University Press, 1959. In the preferred embodiment of this invention, the dewar system maintains the tunneling junction 10 at a temperature of approximately 4.2° K. A variable voltage from a variable DC voltage supply 21 is impressed upon the tunneling junction and as the voltage is varied from 0 to 1.0 volt, the current passing through the tunneling junction is continuously measured by a current analyzer 22. The analyzer 22 provides an output for the instantaneous second derivative of current passing through the junction with respect to voltage impressed upon the junction at a particular impressed junction voltage.

The output of the analyzer 22 is fed to a plotting device 23 of suitable construction. The variable voltage supply 21 is also connected to the plotting device 23. The manner of obtaining second derivative output from the analyzer 22 is discussed more fully in the article Low Level Second Harmonic Detection Systems, by D. E. Thomas and J. M. Rowell, "The Review of Scientific Instruments," vol. 36, Number 9, September 1965. The plotting device 23 may be of the type sold by F. L. Mosely Company as Model #135.

The second derivative output from the analyzer 22 for the propionic acid sample described in conjunction with the preferred embodiment of this invention is shown in detail in FIGURE 3 and is identified by the letter A. More particularly, the A spectrum shows predominant peaks due to CH bending and stretching modes, respectively, as identified by their IR spectrum obtained from L. J. Bellamy, The Infrared Spectra of Complex Molecules, New York, John Wiley and Sons, Inc., 1958.

Thus, by utilization of the method of this invention, wherein a tunneling junction is utilized in a method of analyzing a substance, it is possible to obtain graphic representations of the spectra of the chemical components of the substance under examination. The graph so obtained is comparable with previously prepared standard graphs so as to identify the particular components making up the substance under examination.

While a preferred embodiment of the method of this invention has been described in conjunction with the use of a preferred tunneling junction, other tunneling junctions may also be employed with the method of this invention. In order for a tunneling junction to be utilized, it must have a first electrode, an insulating layer and a second electrode, and the tunneling junction, as a whole, must function as an electronic conductor of electricity.

Many junctions fall within the type suitable for use in the method of this invention and, in addition to the particular tunneling junction already described, such tunneling junctions as tantalum-tantalum oxide lead, aluminum-aluminum oxide-tin, aluminum-aluminum oxide-aluminum may be utilized with the method of this invention and they will give the same results as obtained with the described junction.

The method of this invention is preferably carried out at a temperature approximating that of absolute zero. The preferred temperature is 4.2° K. However, the method may be carried out in temperatures in the range of 0.9° K. to 77° K. However, as the temperature at which the method is carried out is increased, the resolution in the peaks of the graph is more severely limited, that is the peaks are suppressed. However, peaks have been observed for samples up to temperatures approximating that obtained by use of Dry Ice.

In connection with FIGURE 3, spectra B was observed when acetic acid was utilized as the substance to be analyzed with the tunneling junction. As is observed by viewing of FIGURE 3, the spectra A and B are sufficiently distinct from one another to provide a ready indication of the particular substance which has been analyzed. The method of this invention is applicable to the analysis of both organic and inorganic substances.

In an attempt to explain this method of analysis wherein tunneling junctions are employed, it is believed that inelastic electron-molecule interactions occur in the tunneling phenomenon. These inelastic electron-molecule interactions are allowed in the tunneling junction as soon as tunneling electrons have sufficient excess energy to cause molecular excitations. When the voltage across the tunneling junction is increased, an increase in the number of such candidates occurs and this provides the quantum mechanism for increasing electronic conduction as each voltage threshold is reached. This whole mechanism may be compared to what has been observed in phonon interactions in certain p-n- junctions. In any regard, however, one cannot rule out more complex mechanisms which may explain the actual tunneling phenomenon as observed in strong coupling superconductors.

The recognition of the utility of the method of this invention has implications for several aspects of tunneling studies as well as other related subjects. One aspect of significance of this method is the measurement of electron coupling to surface layers on metals. This particular significance is of importance in connection with explanations of proposed mechanisms of surface superconductivity. Also, in this connection one would believe that the tunneling scattering process is related to the more general problem of surface scattering. It may be possible to relate, by the method of this invention, tunneling and surface scattering to elastic scattering. In such a manner this method would then yield a microscopic probe of inelastic surface scattering phenomenon. At this point it should also be noted that the method of this invention has application in the study of various surface phenomena such as adsorption and catalysis. The method also has implications for more advanced studies in the area of metal tunneling junction technology.

Thus, there has been disclosed herein above a method of analyzing a substance which embodies an electron tunneling device and a low temperature media. It is believed that this method provides a revolutionary new tool for utilization in identifying components and has many marked advantages over known prior systems. One particular advantage is that a relatively small amount of material is necessary to form the mono-layer of the substance which is to be analyzed on the insulating layer of a tunneling junction.

What is claimed is:

1. A method of analyzing a substance so as to ascertain the constituents thereof which comprises the steps of:

placing the substance to be analyzed at the interface of an electrode and an insulating layer of a tunneling junction;

impressing a variable voltage upon the tunneling junction;

measuring continuously the current passing through the tunneling junction as the voltage across the junction is varied; and plotting the change in current passing through the junction as a function of the voltage impressed on the junction thereby to obtain a plot wherein specified constituents of the substance being analyzed are identified by the occurrence of peaks on the plot at specific voltages across the tunneling junction.

2. The method of analyzing a substance so as to ascertain the constituents thereof as defined in claim 1 wherein an additional step is employed of:

subjecting the tunneling junction to a cryogenic temperature while said variable voltage is impressed upon the junction and while said current passing through the junction is measured.

3. A method of analyzing a substance so as to ascertain the constituents thereof which comprises the steps of:

forming the electrode-insulating layer portion of a tunneling junction;

depositing the substance to be analyzed on the insulating layer of the tunneling junction;

forming a counter electrode over the substance to be analyzed so as to complete the tunneling junction;

subjecting the tunneling junction to a cryogenic temperature;

impressing a variable voltage upon the tunneling junction;

measuring continuously the current passing through the tunneling junction as the voltage across said junction is varied; and plotting the change in current passing through the junction as a function of voltage impressed on the junction thereby to obtain a plot wherein specified constituents of the substance being analyzed are identified by the occurrence of peaks on the plot at specific voltages across the tunneling junction.

4. The method of analyzing a substance so as to ascertain the constituents thereof as defined in claim 3 wherein:

said plotting step is carried out by plotting the second derivative of the measured junction current with respect to the impressed junction voltage against the specific voltage applied to the junction at the time the derivative is calculated.

5. A method of analyzing a susbtance so as to ascertain the constituents thereof which comprises the steps of:

forming the metal-metal oxide portion of a tunneling junction;

depositing the substance to be analyzed on the metal oxide of the tunneling junction;

forming a metal electrode over the substance to be analyzed so as to complete the tunneling junction.

subjecting the tunneling junction to a cryogenic temperature;

impressing a variable voltage upon the tunneling junction;

measuring continuously the current passing through the tunneling junction as the voltage across the junction is varied; and plotting the second derivative of the measured junction current with respect to the impressed junction voltage against the specific voltage applied to the junction at the time the derivative is calculated thereby to obtain a plot wherein specified constituents of the substance being analyzed are identified by the occurrence of peaks on the plot at specific voltages across the tunneling junction.

6. The method of analyzing a substance so as to ascertain the constituents thereof as defined in claim 5 wherein said metal-metal oxide-metal tunneling junction is selected from a group of tunneling junctions consisting of aluminum-aluminum oxide-lead, tantalum-tantalum oxide-lead, aluminum-aluminum oxide-tin and aluminum-aluminum oxide-aluminum.

7. A method of analyzing a substance so as to ascertain the constituents thereof, which method comprises the steps of:

forming the metal-metal oxide portion of a tunneling junction;

depositing the substance to be analyzed on the metal oxide of the tunneling junction;

forming a metal electrode over the substance to be analyzed so as to complete the tunneling junction;

subjecting the tunneling junction to a temperature in the range from 0.9° K. to 77° K.;

impressing a variable voltage not exceeding 1 volt upon the tunneling junction;

measuring continuously the amount of current passing through the tunneling junction as the voltage across the junction is varied; and plotting the second derivative of the measured junction current with respect to the impressed junction voltage against the specific voltage applied to the junction at the time the derivative is calculated thereby to obtain a plot wherein specified constituents of the substance being analyzed are identified by the occurrence of peaks on the plot at specific voltages across the tunneling junction.

8. The method of analyzing a substance so as to ascertain the constituents thereof as recited in claim 7 wherein the metal-metal oxide-metal tunneling junction is selected from a group of tunneling junctions consisting of aluminum-aluminum oxide-lead, tantalum-tantalum oxide-lead, aluminum-aluminum oxide-tin and aluminum-aluminum oxide-aluminum.

9. A method of analyzing a substance so as to ascertain the constituents thereof as recited in claim 7 wherein the substance to be analyzed is deposited on the metal oxide layer at a thickness of 1 mono-layer.

10. A method of analyzing a substance so as to ascertain the constituents thereof which comprises the steps of:

placing the substance to be analyzed at the interface of an electrode and an insulating layer of a tunneling junction;

impressing a variable voltage upon the tunneling junction so that tunneling electrons of the junction interact with the vibrational states of molecules making up the substance to be analyzed; and detecting the specific interaction of the tunneling electrons with the vibrational states of molecules of the substance to be analyzed at specific voltages across the tunneling junction.

11. The method of analyzing a substance so as to ascertain the constituents thereof as defined in claim 10 wherein an additional step is employed of:

identifying the constituents of the substance to be analyzed in accordance with the patterns of specific interactions which are detected.

References Cited

UNITED STATES PATENTS

| | | | |
|---|---|---|---|
| 2,711,511 | 6/1955 | Pietenpol | 324—71 |
| 3,199,023 | 8/1965 | Bhimani | 324—54 |
| 3,356,864 | 12/1967 | Giaver | 324—71 X |

EDWARD E. KUBASIEWICZ, Primary Examiner

U.S. Cl. X.R.

23—230; 307—245; 324—71